(12) United States Patent
Fouquet et al.

(10) Patent No.: US 6,487,333 B2
(45) Date of Patent: Nov. 26, 2002

(54) TOTAL INTERNAL REFLECTION OPTICAL SWITCH

(75) Inventors: Julie E. Fouquet, Portola Valley, CA (US); Mark Troll, Seattle, WA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/956,468

(22) Filed: Sep. 17, 2001

(65) Prior Publication Data

US 2002/0067879 A1 Jun. 6, 2002

Related U.S. Application Data

(63) Continuation-in-part of application No. 09/470,878, filed on Dec. 22, 1999, now Pat. No. 6,320,994.

(51) Int. Cl.[7] .............................. G02B 6/26; G02B 6/42
(52) U.S. Cl. ......................... 385/18; 385/16; 385/17; 385/19; 385/25; 385/31; 385/39
(58) Field of Search ............................ 385/18, 19, 25, 385/17, 16

(56) References Cited

U.S. PATENT DOCUMENTS

| 4,988,157 A | 1/1991 | Jackel |
| 5,699,462 A | 12/1997 | Fouquet |
| 5,978,527 A | 11/1999 | Donald |

FOREIGN PATENT DOCUMENTS

| DE | 19527566 A1 | 1/1997 |
| EP | 0813088 A2 | 12/1997 |
| EP | 0938013 A2 | 6/1999 |
| EP | 101414 A2 | 6/2000 |
| EP | 1014140 A2 | 6/2000 |
| GB | 2204710 A | 11/1988 |
| GB | 2206977 A | 1/1989 |
| GB | 2206977 * | 1/1989 |

* cited by examiner

Primary Examiner—Cassandra Spyrou
Assistant Examiner—Leo Boutsikaris
(74) Attorney, Agent, or Firm—Ian Hardcastle (57) ABSTRACT

The optical switch comprises a substrate, a planar waveguide circuit, an index-matching liquid, a working fluid and a displacing device. The planar waveguide circuit is supported by the substrate. The planar waveguide circuit and the substrate collectively define a trench that includes a first trench region and a second trench region adjacent the first trench region. The second trench region has a width greater than the first trench region. The planar waveguide circuit includes a first waveguide and a second waveguide. The waveguides intersect at the first trench region and are positioned such that light traversing the first waveguide enters the second waveguide when an index-matching material is present in the first trench region, and is otherwise reflected by said the first trench region. The index-matching liquid is located in at least part of the first trench region. The working fluid is located in the second trench region. The displacing device is coupled to the second trench region, and is for displacing part of the working fluid into the first trench region to interpose the index-matching liquid between the waveguides.

34 Claims, 7 Drawing Sheets

TOTAL INTERNAL REFLECTION OPTICAL SWITCH

PRIOR APPLICATION

This application is a Continuation-in-Part of U.S. patent application Ser. No. 09/470,878, filed on Dec. 22, 1999 now U.S. Pat. No. 6,320,994.

FIELD OF THE INVENTION

The invention relates to optical switches, and more particularly, to an improved cross-point switching element.

BACKGROUND OF THE INVENTION

Optical fibers provide significantly higher data rates than electronic paths. However, effective utilization of the greater bandwidth inherent in optical signal paths requires optical cross-connect switches. In a typical telecommunications environment, signals are switched between optical fibers using an electrical cross-connect switch. The optical signals are first converted to electrical signals. After the electrical signals have been switched, the signals are again converted back to optical signals that are transmitted via the optical fibers. To achieve high throughput, the electrical cross-connect switches utilize highly parallel, and highly costly, switching arrangements. However, even with such parallel architectures, the cross-connect switches remain a bottleneck.

A number of optical cross-connect switches have been proposed; however, none of these has successfully filled the need for an inexpensive, reliable, optical cross-connect switch. One class of optical cross-connect switches depends on wavelength division multiplexing (WDM) to perform the switching. However, this type of system requires the optical signals being switched to have different wavelengths. In systems where the light signals are all at the same wavelength, this type of system requires the signals to be converted to the desired wavelength, switched, and then be re-converted to the original wavelength. This conversion process complicates the system and increases the cost.

A second type of optical cross-connect switch utilizes total internal reflection (TIR) switching elements. A TIR element consists of a waveguide with a switchable boundary. Light strikes the boundary at an angle. In the first state, the boundary separates two regions having substantially different indices of refraction. In this state the light is reflected off of the boundary and thus changes direction. In the second state, the two regions separated by the boundary have the same index of refraction and the light continues in a straight line through the boundary. The magnitude of the change of direction depends on the difference in the index of refraction of the two regions. To obtain a large change in direction, the region behind the boundary must be switchable between an index of refraction equal to that of the waveguide and an index of refraction that differs markedly from that of the waveguide.

One class of prior art TIR elements that provide a large change in index of refraction operates by mechanically changing the material behind the boundary. For example, U.S. Pat. No. 5,204,921, Kanai et al. describes an optical cross-connect based on an array of crosspoints in a waveguide. A groove at each crosspoint, may be switched "on" or "off," depending upon whether the groove is filled with an index-matching oil. The index-matching oil has a refractive index close to that of the waveguides. An optical signal transmitted through a waveguide is transmitted through the crosspoint when the groove is filled with the matching oil, but the signal changes its direction at the crosspoint through total internal reflection when the groove is empty. To change the cross-point switching arrangement, grooves must be filled or emptied. In the system taught in this patent, a "robot" fills and empties the grooves. This type of switch is too slow for many applications of interest.

A faster version of this type of TIR element is taught in U.S. Pat. No. 5,699,462, which is hereby incorporated by reference. The TIR element disclosed in this patent utilizes thermal activation to displace liquid from a gap at the intersection of a first optical waveguide and a second optical waveguide. In this type of TIR element, a trench is cut through a waveguide. The trench is filled with an index-matching liquid. A bubble is generated at the cross-point by heating the index-matching liquid with a localized heater. The bubble must be removed from the cross-point to switch the cross-point from the reflecting to the transmitting state and thus change the direction of the output optical signal.

If the bubble contains noncondensable gases, such as air, it takes too long (minutes) to collapse when the heater is turned off. This is not acceptable for applications that require a fast cycle time. Such a gas bubble can be removed from the cross-point by applying a force to the bubble to move it to one side. However, moving the entire bubble is slow and requires substantial power. In addition, creating a new bubble to replace the bubble removed from the cross-point consumes additional power.

What is needed, therefore, is an optical cross-point switch that can be switched rapidly and with less power than prior art cross-point switches.

SUMMARY OF THE INVENTION

The invention provides an optical switch that comprises a substrate, a planar waveguide circuit, an index-matching liquid, a working fluid and a displacing device. The planar waveguide circuit is supported by the substrate. The planar waveguide circuit and the substrate collectively define a trench that includes a first trench region and a second trench region adjacent the first trench region. The second trench region has a width greater than the first trench region. The planar waveguide circuit includes a first waveguide and a second waveguide. The waveguides intersect at the first trench region and are positioned such that light traversing the first waveguide enters the second waveguide when an index-matching material is present in the first trench region, and is otherwise reflected by said the first trench region. The index-matching liquid is located in at least part of the first trench region. The working fluid is located in the second trench region. The displacing device is coupled to the second trench region, and is for displacing part of the working fluid into the first trench region to interpose the index-matching liquid between the waveguides.

The index-matching liquid may additionally be located in the second trench region and may additionally serve as the working fluid.

The planar waveguide circuit may additionally include a third waveguide having an end terminating at the trench and positioned such that light traversing the first waveguide enters the third waveguide when no index-matching medium is present in the first trench region.

The trench may additionally include a third trench region adjacent the first trench region and remote from the second trench region. The third trench region has a width greater than the first trench region. The working fluid is additionally located in the third trench region. The working fluid and the index-matching liquid partially fill the first trench region so that a bubble of a low refractive index material additionally exists in the trench region. The displacing device is additionally coupled to the third trench region. The displacing device is for displacing part of the working fluid from the second trench region to interpose the index-matching liquid between the waveguides and is additionally for displacing part of said working fluid from the third trench region to interpose the bubble between the waveguides.

The index-matching liquid may additionally be located in the second trench region and the third trench region and may additionally serve as the working fluid.

The optical switch may additionally comprise constrictions disposed along the length of the first trench region at locations corresponding to the location of a surface of the bubble when the index-matching liquid is interposed between the waveguides and when the bubble is interposed between the waveguides.

The optical switch may additionally comprise a balance channel interconnecting the second trench region and the third trench region and having a substantially greater hydraulic resistance than the first trench region.

DETAILED DESCRIPTION OF THE INVENTION

Figure 1:
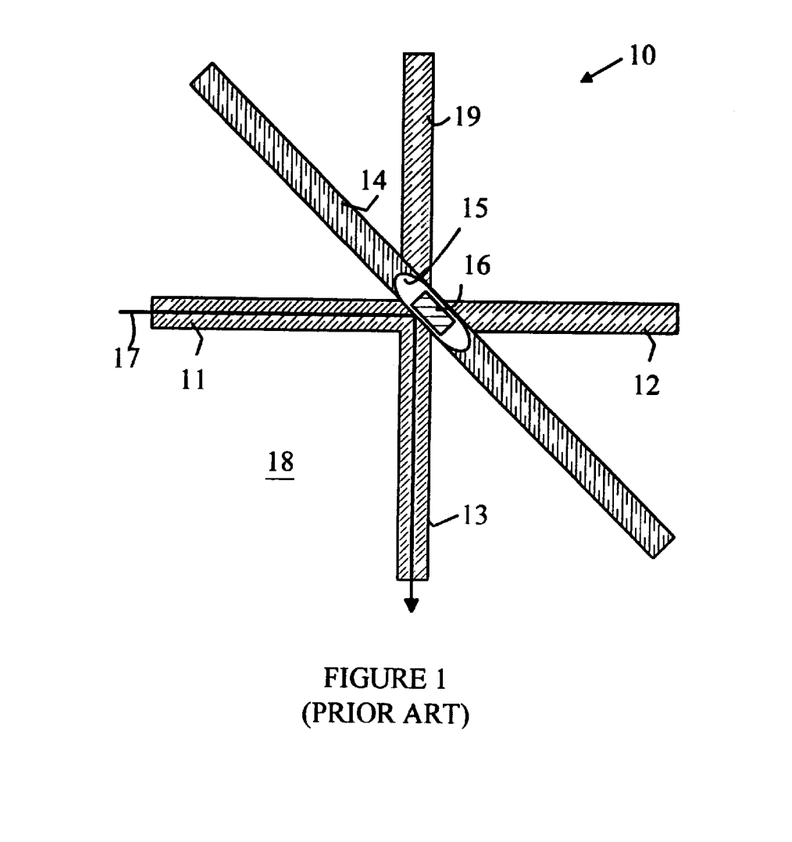
FIGS. 1 and 2 are top views of a prior art cross-point switching element 10 having two states.
Figure 2:
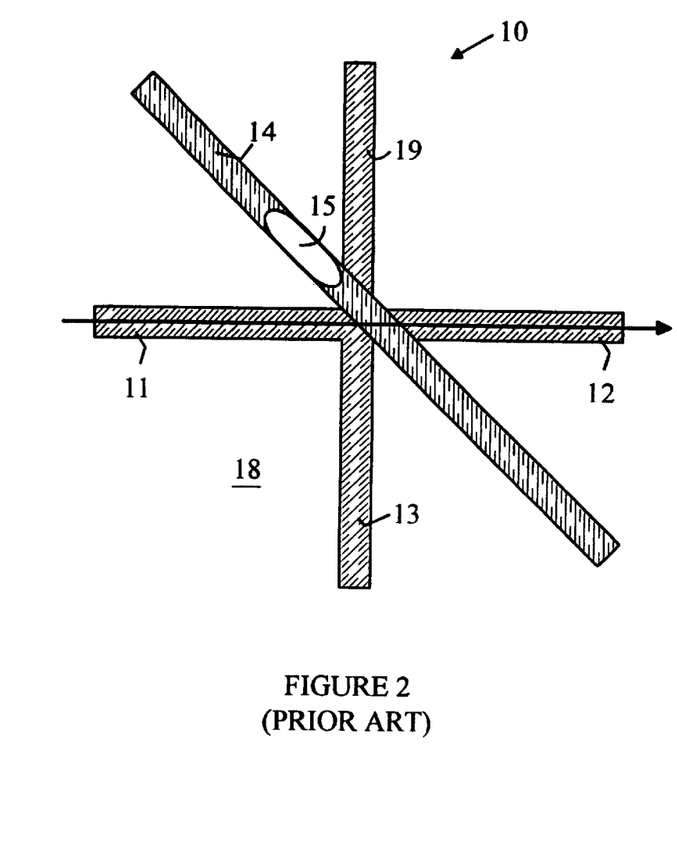

The invention may be more easily understood with reference to FIGS. 1 and 2, which are top views of a prior art cross-point switching element 10 in each of its two switching states. Switching element 10 is constructed from three waveguides 11–13 that are fabricated in a planar lightwave circuit on top of a substrate. The substrate is preferably a silica, but other materials, such as silicon, may be used. The waveguides are defined by two cladding layers and a core layer. To simplify the drawing, the individual layers have been omitted. The fabrication of such waveguides in silica is well known to the art, and hence will not be discussed in detail here. For example, Hitachi Cable and Photonic Integration Research, Inc. in Columbus, Ohio have demonstrated waveguides in $SiO_2$ on silica and silicon substrates. The core is primarily $SiO_2$ doped with another material, such as Ge or $TiO_2$. The cladding material is $SiO_2$, doped with another material such as $B_2O_3$ and/or $P_2O_5$. Because the core material has a refractive index that is different from the refractive index of the cladding layers, optical signals will be guided along waveguides 11–13.

A trench 14 is etched through the waveguide and preferably into the silicon substrate. Trench 14 is positioned such that a light signal travelling down waveguide 11 will be reflected into waveguide 13 if the index of refraction of the material filling trench 14 is substantially different from the index of refraction of the waveguides as shown in FIG. 1. This state of the switching element will be referred to as the "reflecting" state. If, however, the intersection of the trench and the waveguides is filled with an index-matching material having an index of refraction that matches that of the core of the waveguides, the light signal will pass through trench 14 and exit via waveguide 12 as shown in FIG. 2. This state of the switching element will be referred to as the "transmissive" state.

The angle at which waveguides 11 and 13 intersect trench 14 depends on the difference in the index of refraction between the waveguide material and the material used to create the reflecting state in the trench. The angles of incidence of the waveguides and the position of the trench are chosen such that light incident on the trench wall from waveguide 11 is totally reflected into waveguide 13. This angle is typically between 53 and 75 degrees with respect to the normal direction of the trench wall.

When the trench 14 is filled with the index-matching material, light traveling down a fourth waveguide 19 will pass into waveguide 13. Waveguide 19 is used to construct cross-connect switches utilizing a two-dimensional array of cross-point switching elements. An array of this type is typically constructed as a plurality of rows and columns of cross-point switching elements. The rows and columns are connected via row and column waveguides. The cross-connect switch connects signals input on the row waveguides to the column waveguides. The specific switching pattern depends on the states of the switching elements.

In these simple cross-connect switches, at any given time, there is at most one switching element in each column that switches light from a row waveguide into a column waveguide. The light switched into the column waveguide is transmitted to the end of the column through switching elements that are in the transmissive state. Waveguide 19 allows light switched by a switching element above element 10 in the array to be transmitted to the next switching element in the column below it so that the light can eventually exit from the last switching element in the column.

As noted above, the index-matching material may be displaced from the intersection by locating a bubble 15 at the intersection. For example, the bubble may be formed at the intersection with the aid of a heating element 16. Small heating elements suitable for this function are well known in the ink jet printing arts, and hence, will not be discussed in detail here. The heating element is preferably located below the waveguides to assure that it does not block light crossing the trench. The bubble can be generated by vaporizing the index-matching liquid or by releasing a gas dissolved in the liquid.

The bubble may be removed by allowing it to collapse or by moving it to one side as shown in FIG. 2. Moving the bubble to one side requires that the bubble be positively displaced by a distance at least equal to the length of the bubble. Such positive displacements pose technical problems.

Figure 3:
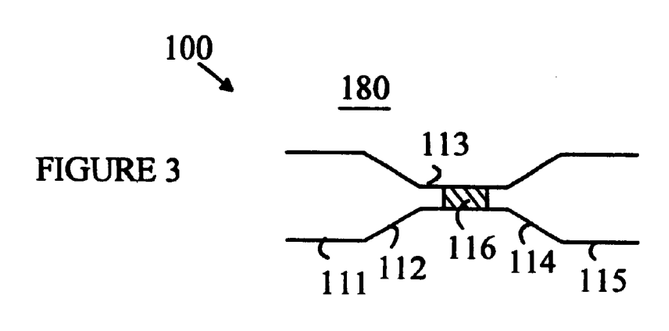
FIG. 3 is a top view of a previously-disclosed cross-point trench 100.
Figure 4:
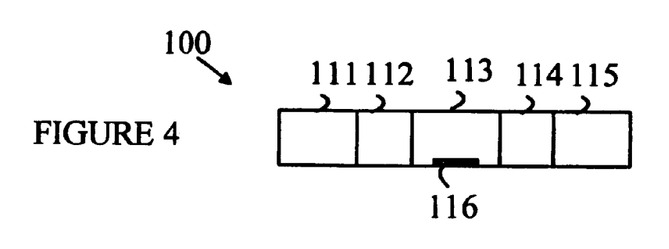
FIG. 4 is a side view of trench 100.
Figure 5:
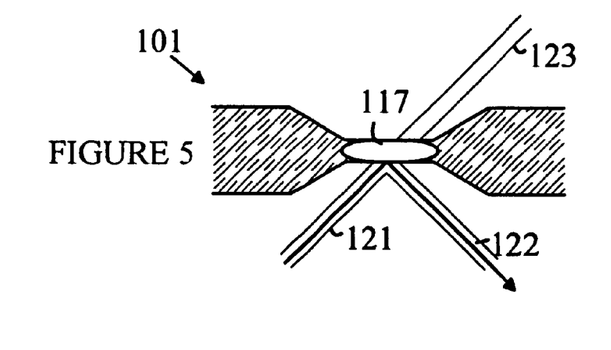
FIG. 5 is a top view of a switching element 101 utilizing trench 100.

FIGS. 3 and 4 are respectively a top view and a side view of a previously-disclosed cross-point trench 100. Trench 100 replaces trench 14 shown in FIGS. 1 and 2. FIG. 5 is a top view of a switching element 101 incorporating trench 100. FIG. 5 illustrates the reflection of a light signal from the trench wall when a bubble 117 is present. To simplify the drawings, the waveguides shown at 121–123 in FIG. 5 have been omitted from FIGS. 3 and 4. Trench 100 is preferably etched in a substrate 180 and includes a gap section 113 having parallel walls that either reflect a light signal as shown in FIG. 5 or allow the light signal to pass through the trench when section 113 is filled with an index-matching material. The portion of the trench on either side of section 113 is flared as shown at 112 and 114. A heating element 116 is located on the bottom of trench 100. The walls 111 and 115 of the trench on either side of the flared region are parallel to one another; however, other geometries can be used.

Figure 6:
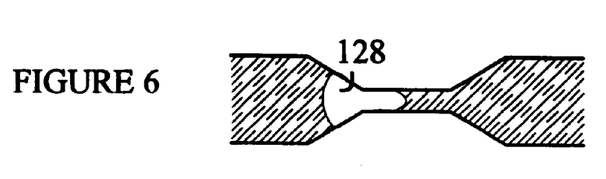
FIGS. 6 and 7 illustrate the manner in which a bubble in region 113 is displaced.
Figure 7:
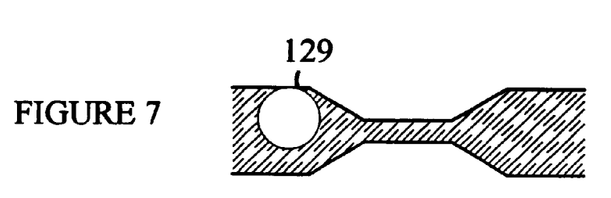

Refer now to FIGS. 6 and 7, which illustrate the manner in which a bubble in region 113 is displaced. A bubble formed in region 113 that does not extend beyond 113 will remain in region 113, as shown in FIG. 5. However, if the bubble is displaced slightly to one side, so that a portion of the bubble enters one of the flared regions, as shown at 128 in FIG. 6, the surface tension of the bubble will draw the bubble into the flared region until the bubble is located entirely inside the flared region or in the region beyond the flared region, as shown in FIG. 7 at 129. Once the bubble is displaced into the flared region, the trench will be transparent to the light and the cross-point will have been switched. The bubble will then collapse without further aid, or can otherwise be removed. If the cross-point must be switched back to the reflective state, a new bubble can be introduced in region 113 by re-activating heating element 116.

Figure 8:
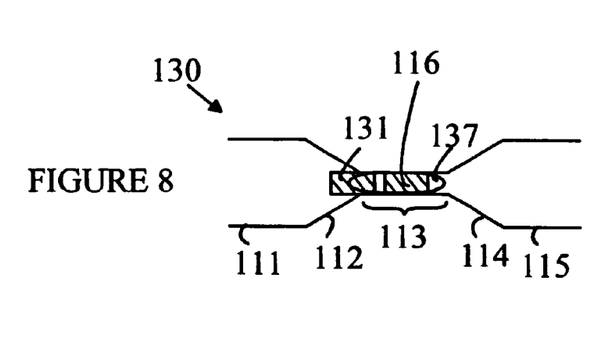
FIG. 8 is a top view of another, previously-disclosed embodiment of a cross-point trench.

Refer now to FIG. 8, which is a top view of another previously-disclosed cross-point trench 130. To simplify the following description, features of trench 130 that serve the same functions as features of trench 100 shown in FIGS. 3 and 4 are indicated by the same reference numerals. Trench 130 differs from trench 100 in that a second heating element shown at 131 is located on the bottom of the trench at a location that is partially in flared region 112. Heating element 131 is used to destabilize a bubble generated by heating element 116 in region 113, such as the bubble shown at 137. When heating element 131 is activated, bubble 137 is enlarged in the area over heating element 131. The new bubble now extends into the flared region of the trench. As noted above, such a bubble is automatically drawn into the flared region and out of region 113 by the mechanism described above with reference to FIGS. 6 and 7. It should be noted that the heater shown in FIG. 8 can alternatively be placed at the other end of region 113.

Figure 9:
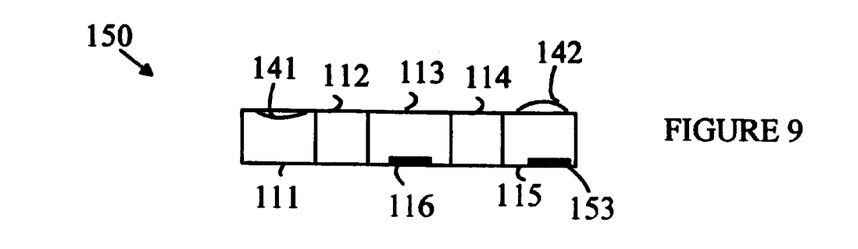
FIG. 9 is a side view of another, previously-disclosed embodiment of a cross-point trench.
Figure 10:
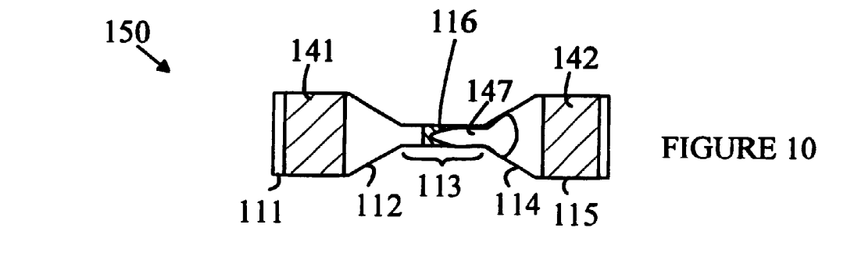
FIG. 10 is a top view of another, previously-disclosed embodiment of a cross-point trench according to the present invention.

A bubble in region 113 can also be displaced sufficiently to cause it to leave region 113 by generating a pressure differential across region 113. Refer now to FIGS. 9 and 10, which are side and top views, respectively, of another previously-disclosed cross-point trench. To simplify the following description, features of trench 130 that serve the same functions as features of trench 100 shown in FIGS. 3 and 4 are indicated by the same reference numerals. Trench 150 includes two diaphragms, shown at 141 and 142, that can be deformed to alter the pressure in trench 150. In the trench shown in FIGS. 9 and 10, the diaphragms are operated in a "push-pull" manner such that they increase the pressure on one side of region 113 while they decrease the pressure on the other side of the region. This pressure differential is sufficient to shift the location of bubble 147 part-way into region 114. Once part-way in region 114, the bubble is automatically extracted from region 113.

The required displacement of the bubble is much smaller than in systems requiring displacement to completely move the bubble out of region 113. Diaphragm designs of the type utilized in ink jet printers may be utilized for this purpose. While the trench shown in FIGS. 9 and 10 includes diaphragms that are placed over the top of the trench, any device that alters the pressure or volume on at least one side of region 113 may be used. For example, piezoelectric transducers or micromechanical devices may be used. For example, a heating element 153 may be located in region 115. Heating element 153 dissipates sufficient power to generate a bubble that alters the pressure on the side of region 113 on which the heater is located. After it has shifted the bubble part-way into region 114, the pressure-inducing bubble is allowed to collapse.

The length of region 113 is preferably chosen to be sufficiently large to accommodate the entire light signal passing through region 113 when the switching element is transparent. Due to the nature of optical propagation in planar lightwave circuits, this region must be slightly larger than the waveguide cores that terminate on each side of region 113.

Referring additionally to FIG. 1, the trench walls on each side of region 113 are parallel to one another, so that waveguides 11 and 12 are collinear and waveguides 19 and 13 are collinear. In principle, only the wall that reflects the light signal when the optical switch is in the reflective state needs to be planar. However, if a liquid must be used whose refractive index does not exactly match that of the waveguide, the optical signal refracts as it enters the liquid when the optical switch is in its transparent state and again as it exits. This refraction leads to a net lateral translation. The exit waveguide can be moved to accommodate this translation. If the trench walls are parallel at the entry and exit points, the original waveguide pitch and angle can be maintained despite these translations. However, if. the entry and exit walls are not parallel, the exit waveguide angle differs from the entrance waveguide angle and the pitch is distorted. These changes can complicate the optical interconnections required when constructing a cross-point switch having many switching elements.

The above-described trenches are shown as including three waveguides; however, embodiments having only two waveguides can also be constructed. Still additionally referring to FIG. 1, either waveguide 12 or waveguide 13 can be replaced by a light absorbing medium. In such embodiment, the optical switch has a first state that transmits the light signal from the input waveguide to the remaining output waveguide, and a second state in which the light signal is absorbed. The embodiment in which output waveguide 13 is eliminated is particularly useful in constructing N:1 optical multiplexers.

Figure 11:
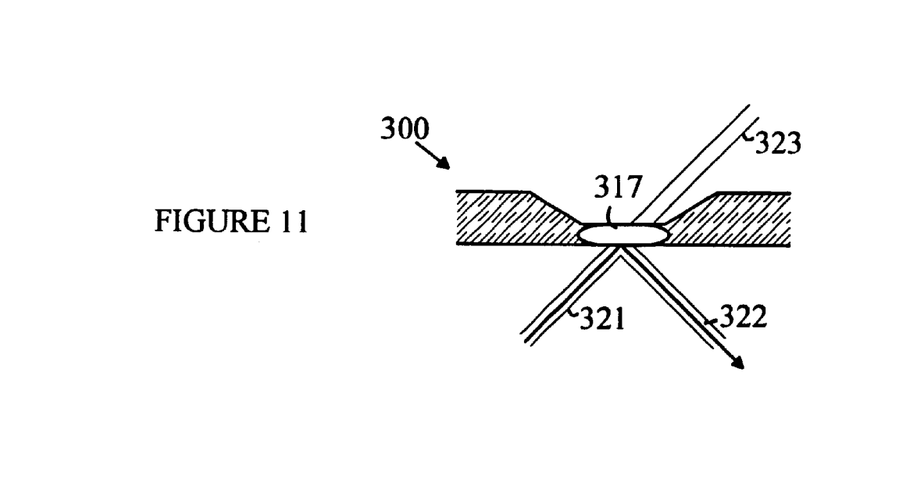
FIG. 11 is a top view of another, previously-disclosed embodiment embodiment of a cross-point trench.

The above-described trenches include a flared region to each side of region 113 of the trench. However, the flared region can be eliminated provided the region on the side of the gap to which the bubble is to be displaced is larger than the gap. Refer now to FIG. 11, which is a top view of a trench 300 having such alternative configuration. Trench 300 connects waveguides 321 to 322 when bubble 317 is present in the trench and connects waveguides 321 and 323 when the trench is filled with an index-matching liquid.

The optical switch structures described above operate with disposable bubbles. Each time the optical switch switches to its reflective state, a new bubble is created from the index-matching liquid. When the optical switch switches to its transmissive state, the bubble is removed from trench region 113 and is thrown away. Creating a new bubble consumes energy. Energy consumption can be reduced by not creating a new bubble each time the optical switch switches to its reflective state. Optical switches based on the structures described above but that do not create a new bubble each time the optical switch switches to its reflective state will now be described.

Figure 12:
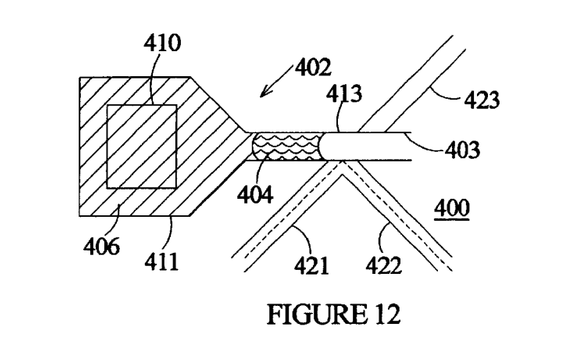
FIG. 12 is a top view of a first embodiment of an optical switch according to the invention in its reflective state.
Figure 13:
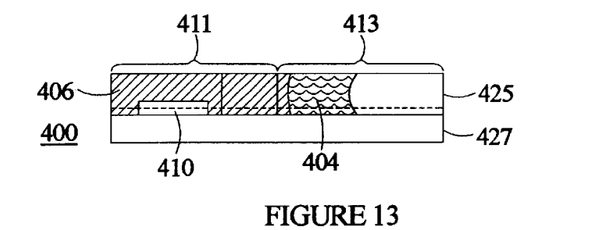
FIG. 13 is a side view of the optical switch shown in FIG. 12 in its reflective state.

FIGS. 12 and 13 are a top view and a side view, respectively, of a first embodiment 400 of an optical switch according to the invention. Optical switch 400 includes waveguides 421, 422 and 423 formed in planar lightwave circuit 425 supported by substrate 427. Trench 402 extends through the planar lightwave circuit and extends part-way into the substrate.

Trench 402 includes trench region 411 and trench region 413, adjacent trench region 413. Trench region 411 has a width greater than that of trench region 413. End 403 of trench region 413 is connected to a pressure source (not shown). For example, end 403 may be connected to a source of atmospheric pressure. Alternatively, a pressure different from atmospheric pressure may be used: a higher pressure causes optical switch 400 to switch from its transmissive state to its reflective state more quickly, but requires that displacing device 410, to be described below, be more powerful.

Waveguides 421, 422 and 423 intersect at trench region 413 and are positioned such that light traversing waveguide 421 enters waveguide 422 when an index-matching material is present in trench region 413, and otherwise is reflected by trench region 413 into waveguide 422.

Index-matching liquid 404 is located in part of trench region 413. Working fluid 406 is located in trench region 411. The working fluid and the index-matching liquid are mutually immiscible. A liquid metal, such as mercury or gallium may be used as the working fluid. Other non-metallic liquids may alternatively be used.

Working fluid 406 is additionally shown as extending from trench region 411 part-way into trench region 413 adjacent trench region 411, although this is not essential. The amount of index-matching liquid 404 in trench region 413 is such that, in the transmissive state of optical switch 400 shown in FIG. 14, the index-matched liquid is interposed between the ends of waveguides 421 and 423. Additionally, the amounts of working fluid 406 and index-matching liquid 404 in trench region 413 are such that, in the reflective state of optical switch 400 shown in FIG. 12, the index-matching liquid does not contact the end of waveguide 421 so that trench region 413 reflects light traversing waveguide 421 into waveguide 422.

Displacing device 410 is located in trench region 411. The displacing device operates to displace part of working fluid 406 into trench region 413. The amount of the working fluid displaced is sufficient to interpose index-matching liquid 404 between waveguides 421 and 423.

Figure 14:
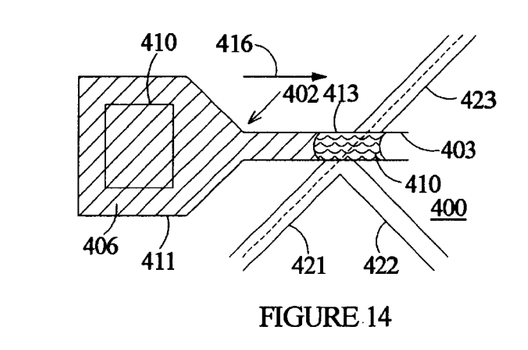
FIG. 14 is a top view of the optical switch shown in FIG. 12 in its transmissive state.
Figure 15:
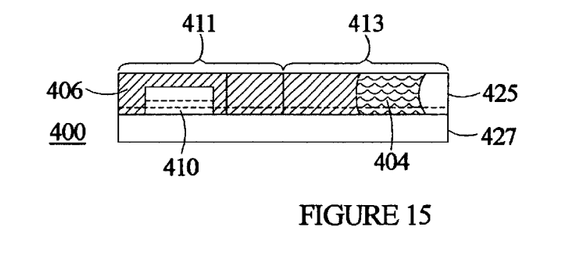
FIG. 15 is a side view of the optical switch shown in FIG. 12 in its transmissive state.

FIGS. 14 and 15 show optical switch 400 in its transmissive state. In this, the volume of displacing device 410 has increased, and the increased volume of the displacing device has displaced part of working fluid 406 in trench region 413. The working fluid displaced into trench region 413 moves the index-matching liquid along trench region 413 in the direction indicated by arrow 416 to interpose index-matching liquid 404 between waveguides 421 and 423. As a result, light traversing waveguide 421 passes through trench region 413 into waveguide 423.

Restoring displacing device 410 to its original volume shown in FIG. 13 allows the pressure asserted at the end 403 of trench region 413 to return the part of working fluid 406 in trench region 413 to trench region 411. This moves index-matching liquid 404 along trench region 413 in the direction opposite to that indicated by arrow 416, and thus removes the index-matching liquid from contact with the end of waveguide 421. As a result, trench region 413 once more reflects light traversing waveguide 421 into waveguide 422.

As noted above, displacing device 410 can be a piezo-electric transducer that changes its volume in response to an electrical control signal. Alternatively, a micromechanical device that reduces the effective volume of trench region 411 in response to an electrical control signal can be used as the displacing device. Moreover, a diaphragm, described above, can be used as displacing device 410 to reduce the effective volume of trench region 411.

As a further example, displacing device 410 can be a heater located in trench region 411. A volatile liquid can be used as working fluid 406. In response to an electrical control signal, heat generated by the heater evaporates part of the working fluid to form a bubble of vapor in trench region 411. This bubble expels the part of working fluid 406 from trench region 411 into trench region 413 to move index-matching liquid 404 as described above. Discontinuing the heating allows the bubble to collapse, which allows the expelled working fluid to return to trench region 411.

Alternatively, a liquid metal can be used as working fluid 406, as noted above. Liquid metals have a large coefficient of thermal expansion. Heating the working fluid using the heater causes the working fluid to expand, which expels the part of the working fluid into trench region 413, as described above. Discontinuing the heating allows the working fluid to cool, and the resulting contraction allows the expelled working fluid to return to trench region 411.

Figure 16:
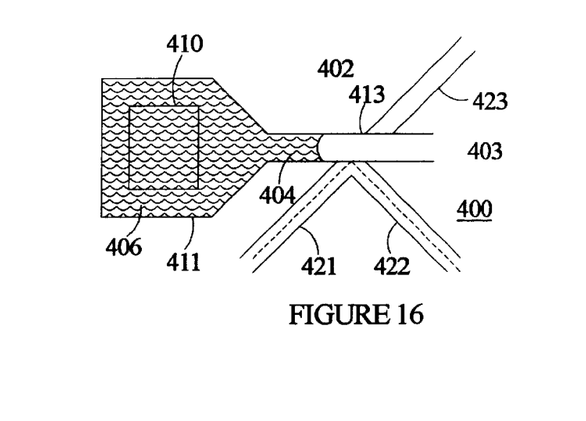
FIG. 16 is a top view of a variation on the optical switch shown in FIG. 12 in which the index-matching liquid serves as the working fluid. The optical switch is shown in its reflecting state.
Figure 17:
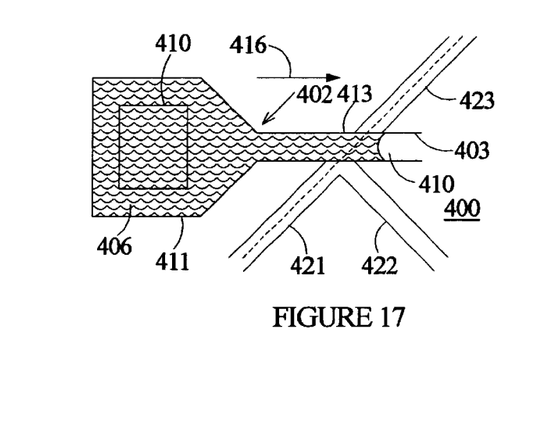
FIG. 17 is a top view of the optical switch shown in FIG. 16 in its transmissive state.

The invention has been described with reference to an example in which a working fluid, different from the index-matching liquid, is located in trench region 411. However, this is not critical to the invention. The index-matching liquid may additionally be located in trench region 411 and serve as the working fluid, as shown in FIGS. 16 and 17.

The invention has also been described with reference to an example in which the walls of trench region 413 are parallel. However, this is not critical to the invention. The walls of trench region 413 can diverge along the length of the trench region. Diverging walls operate together with the surface tension of the index-matching liquid to help move the index-matching liquid in the direction opposite to the arrow 416 when optical switch 400 switches to its reflective state.

The invention has also been described with reference to an example in which trench region 411 has a tapered end wall adjoining trench region 413. However, this is not critical to the invention. The end wall of trench region 411 adjoining trench region 413 can be parallel to the end wall remote from trench region 413.

FIGS. 18–24 show a second embodiment 500 of an optical switch according to the invention. In this embodiment, the trench is composed of two wide trench regions interconnected by an elongate narrow trench region intersected by the waveguides. The narrow trench region is part-filled with an index-matching liquid and a working fluid in a way that leaves this trench region additionally occupied by a bubble of low refractive index material such as vapor or gas. The bubble is located between the index-matching liquid and part of the working fluid. Displacing devices located in both wide trench regions operate push-pull to move the index-matching liquid and the bubble back and forth in the narrow trench region. Elements of optical switch 500 that correspond to elements of optical switch 400 are indicated using the same reference numerals and will not be described again here.

Figure 18:
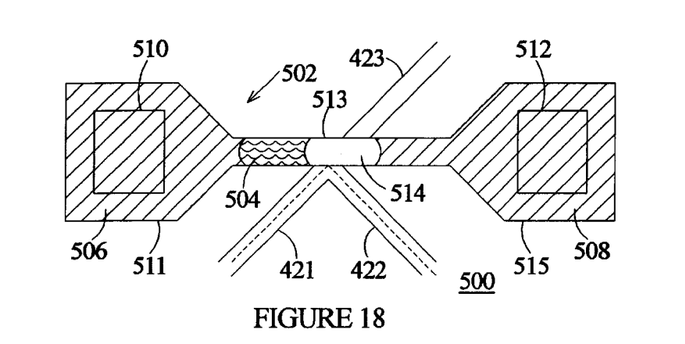
FIG. 18 is a top view of a second embodiment of an optical switch according to the invention in its reflective state.
Figure 19:
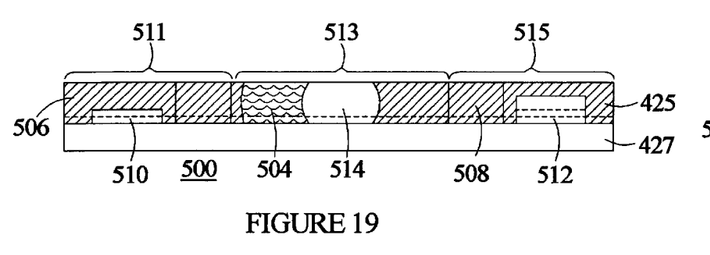
FIG. 19 is a side view of the optical switch shown in FIG. 18 in its reflective state.

Optical switch 500 includes trench 502 extending through planar lightwave circuit 425 and part-way into substrate 427.

Trench 502 includes trench regions 511 and 515 interconnected by elongate trench region 513. Trench regions 511 and 515 are wider than trench region 513. Waveguides 421, 422 and 423 intersect at trench region 513 and are positioned such that light traversing waveguide 421 enters waveguide 422 when an index-matching material is present in trench region 513, and is otherwise reflected by trench region 513 into waveguide 422.

Index-matching liquid 504 is located in part of trench region 513. Working fluid 506 is located in trench region 511, and working fluid 508 is located in trench region 515. The working fluid is additionally shown as extending from trench regions 511 and 515 part-way into trench region 513, although it is not essential that the working fluid extend into trench region 513 from both of trench regions 511 and 515.

Figure 20:
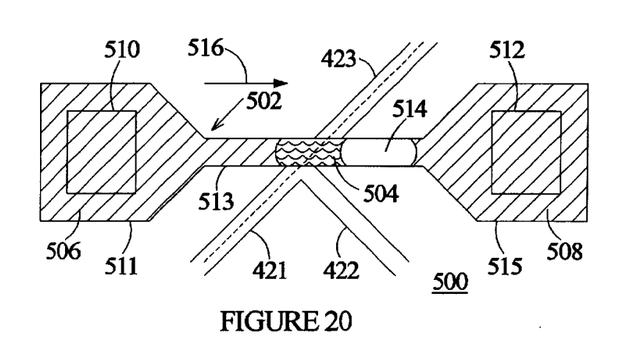
FIG. 20 is a top view of the optical switch shown in FIG. 18 in its transmissive state.
Figure 21:
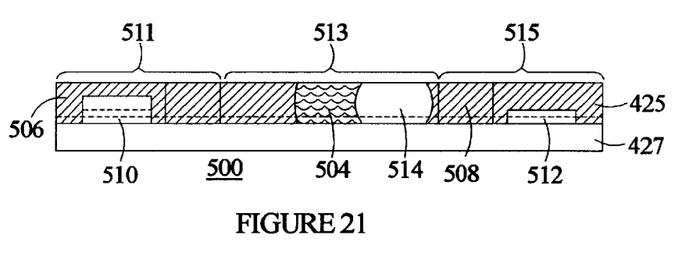
FIG. 21 is a side view of the optical switch shown in FIG. 18 in its transmissive state.

The amount of the index-matching liquid in trench region 513 is such that, in the transmissive state of optical switch 500 shown in FIGS. 20 and 21, the index-matched liquid contacts the ends of waveguides 421 and 423. Additionally, working fluid 506, working fluid 508 and index-matching liquid 504 collectively only partially fill trench region 513 so that bubble 514 of low refractive index material, such as vapor or gas, additionally exists in trench region 513. The size of the bubble is such that, in the reflective state of optical switch 500 shown in FIGS. 18 and 19, the bubble contacts the end of waveguide 421 so that trench region 513 reflects light traversing waveguide 421 into waveguide 422.

Displacing device 510 is located in trench region 511, and displacing device 512 is located in trench region 515. The displacing devices operate in push-pull to move index-matching liquid 504 and bubble 514 back and forth along the length of trench region 513 to interpose either the index-matching liquid or the bubble between waveguides 421 and 423. Specifically, in the reflective state of optical switch 500 shown in FIGS. 18 and 19, displacing device 510 is in its low-volume state, displacing device 512 is in its high-volume state and bubble 514 is interposed between waveguides 421 and 423.

Changing displacing device 510 to its high-volume state and displacing device 512 to its low-volume state displaces part of working fluid 506 into trench region 513. The amount of working fluid 506 displaced is sufficient to move index-matching liquid 504 and bubble 514 along trench region 513 in the direction indicated by arrow 516 to a point where the index-matching liquid is interposed between waveguides 421 and 423, as shown in FIGS. 20 and 21. This switches optical switch 500 to its transmissive state. The part of working fluid 508 displaced from trench region 513 by the part of working fluid 506 displaced from trench region 511 is accommodated by trench region 515, and specifically by the low-volume state of displacing device 512.

Restoring displacing device 510 to its low-volume state and displacing device 512 to its high-volume state shown in FIG. 19 drives a part of working fluid 508 back into trench region 513. This moves index-matching liquid 504 and bubble 514 along trench region 513 in the direction opposite to that indicated by arrow 516, removes the index-matching liquid from between waveguides 421 and 423, and interposes the bubble between waveguides 421 and 423. Specifically, the low refractive index material of bubble 514 is placed in contact with the end of waveguide 421, and trench region 513 once more reflects light traversing waveguide 421 into waveguide 422.

Devices described above with reference to displacing device 410 can be used as displacing devices 510 and 512.

Figure 22:
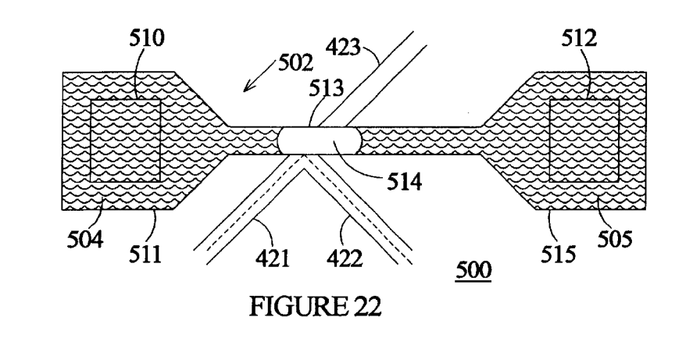
FIG. 22 is a top view of a variation on the optical switch shown in FIG. 18 in which the index-matching liquid serves as the working fluid. The optical switch is shown in its reflecting state.
Figure 23:
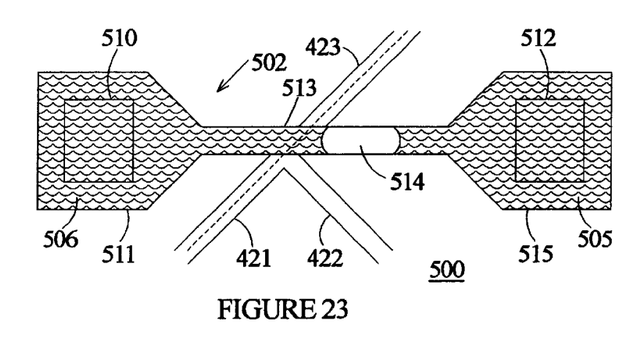
FIG. 23 is a top view of the optical switch shown in FIG. 22 in its transmissive state.

The invention has been described with reference to an example in which a working fluid, different from the index-matching liquid, is located in trench regions 511 and 515. However, this is not critical to the invention. Index-matching liquid 504 may additionally be located in trench region 511 and index-matching liquid 505 may additionally be located in trench region 515, as shown in FIGS. 22 and 23, and may additionally serve as the working fluid.

The invention has also been described with reference to an example in which trench regions 511 and 515 each have a tapered end wall adjoining trench region 513. However, this is not critical to the invention. The end walls of trench regions 511 and 515 adjoining trench region 513 can be parallel to the end walls remote from trench region 513.

Figure 24:
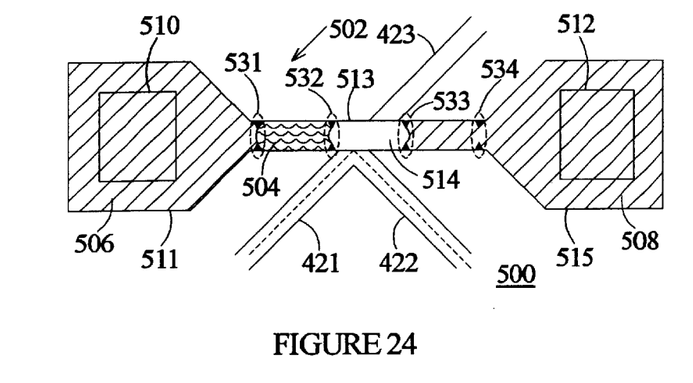
FIG. 24 is a top view of a variation on the optical switch shown in FIG. 18 in which the first trench region includes constrictions. The optical switch is shown in its reflecting state.
Figure 25:
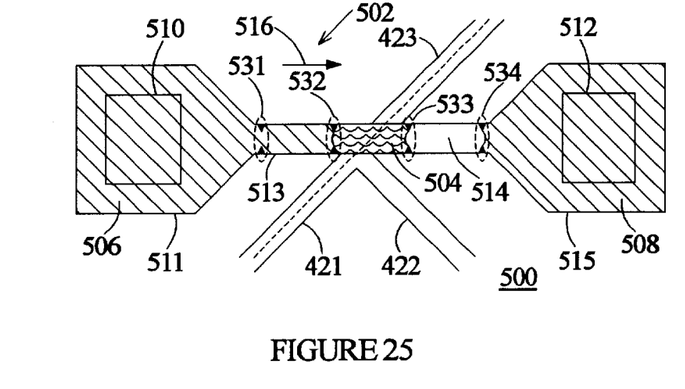
FIG. 25 is a top view of the optical switch shown in FIG. 24 in its transmissive state.

FIGS. 24 and 25 show a variation on the optical switch 500 shown in FIGS. 18–24. FIG. 24 shows the optical switch in its reflective state and FIG. 25 shows the optical switch in its transmissive state. In this variation, trench region 513 includes constrictions 531, 532, 533 and 534 where trench region 513 has a reduced cross-sectional area.

Constrictions 531–533 are located at substantially equally-spaced points along the length of trench region 513. Trench region 513 is filled with quantities of working fluid 508 and index-matching liquid 504 such that bubble 514 and index-matching liquid 504 occupy portions of trench region 513 having lengths equal to the spacing between the constrictions. Trench region 513 is additionally filled with a quantity of working fluid 506 sufficient to locate the surface between working fluid 506 and index-matching liquid 504 at constriction 531 when optical switch 500 is in its reflective state shown in FIG. 24. This locates the surfaces between index-matching liquid 504 and bubble 514 and between bubble 514 and working fluid 508 at points along the length of trench region 513 corresponding to constrictions 532 and 533, respectively, when optical switch 500 is in its reflective state. When optical switch 500 is in its transmissive state shown in FIG. 25, the surfaces between working fluid 506 and index-matching liquid 504, between index-matching liquid 504 and bubble 514 and between bubble 514 and working fluid 508 are located at points along the length of trench region 513 corresponding to the locations of constrictions 532–534, respectively.

Constrictions 531–534 operate together with the surface tension at the above-mentioned surfaces to hold the index-matching liquid 504 and bubble 514 at their positions along the length of trench region 513 corresponding to the reflective and transmissive states of optical switch 500, and thus increases the operational reliability of the optical switch.

Trench region 413 of the embodiment shown in FIGS. 12–17 may also be modified to include at least one constriction.

Trench region 513 of the embodiment shown in FIGS. 22 and 23 may also be modified to include as many as three constrictions.

The invention has been described with reference to examples in which the optical switch operates substantially statically. Power is applied to displacement device 512 to hold optical switch 500 in its transmissive state shown in FIG. 18. Power is applied to displacement device 510 to hold the optical switch in its reflective state shown in FIG. 20. However, static operation is not critical to the invention. The constrictions described above enable the optical switch according to the invention to operate dynamically. When operating dynamically, the optical switch consumes power only when changing state and therefore has reduced power consumption.

Figure 26:
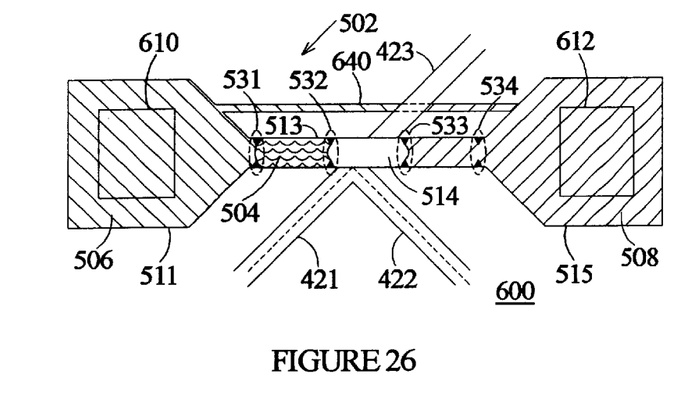
FIG. 26 is a top view of a third embodiment of an optical switch according to the invention in its reflective state.
Figure 27:
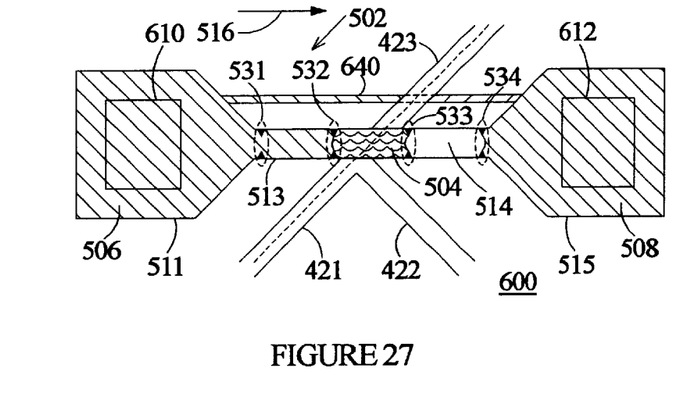
FIG. 27 is a top view of the third embodiment of an optical switch according to the invention in its transmissive state.

FIGS. 26 and 27 show a third embodiment 600 of an optical switch according to the invention. FIG. 26 shows the optical switch in its reflective state and FIG. 27 shows the optical switch in its transmissive state. Elements of the optical 600 that correspond to elements of the optical switches 400 and 500 shown in FIGS. 12–25 are indicated by the same reference numerals and will not be described again here.

In the optical switch 600, trench region 513 includes constrictions 531, 532, 533 and 534, described above, and trench region 513 is filled with working fluid 506, working fluid 508 and index-matching liquid 504 to form bubble 514, as described above with reference to FIGS. 24 and 25.

Optical switch 600 additionally includes balance channel 640. Balance channel 640 is formed in substrate 427 underneath planar lightwave circuit 425. Balance channel 640 extends between trench region 511 and trench region 515. Balance channel 640 has a smaller cross-sectional area than trench region 513 and therefore has a substantially higher hydraulic impedance than trench region 513.

Displacement devices 610 and 612 are three-state devices, each having an equilibrium state when no control signal is applied, an increased-volume state when a control signal of a first polarity is applied and a decreased-volume state when a control signal of a second polarity, opposite the first polarity, is applied.

Figure 28:
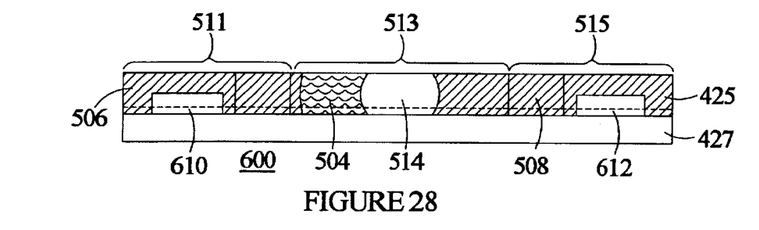
FIG. 28 is a side view of the third embodiment of an optical switch according to the invention in its equilibrium reflective state.

Operation of optical switch 600 will now be described with reference to FIGS. 26–34. FIG. 28 shows optical switch 600 in its equilibrium reflective state. Constrictions 531–534 shown in FIG. 26 hold bubble 514 in place at the end of waveguide 421 so that trench region 513 reflects light traversing waveguide 421 into waveguide 422. Optical switch 600 will stay in its equilibrium reflective state until control signals are applied to displacing devices 610 and 612.

Figure 29:
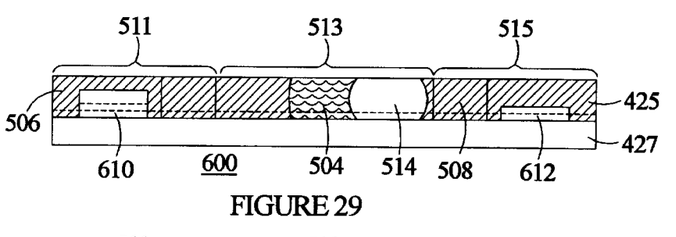
FIG. 29 is a side view of the third embodiment of an optical switch according to the invention after it has switched to its transmissive state.
Figure 32:
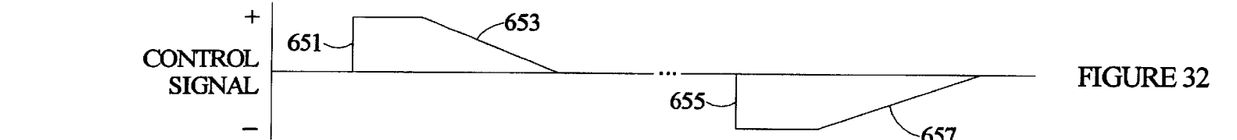
FIG. 32 is a graph showing the control signal applied to one of the displacing devices of the optical switch shown in FIG. 27 to switch the optical switch between its reflective and transmissive states and vice versa.
Figure 33:
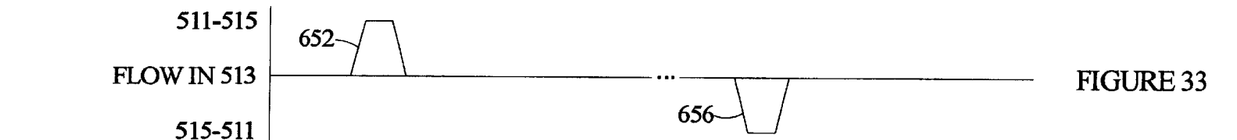
FIG. 33 is a graph showing liquid flow through the first trench region of the optical switch shown in FIG. 27 as the optical switch is switched between its reflective and transmissive states and vice versa.

FIG. 32 shows at 651 part of the control signal applied to displacing device 610 to switch optical switch 600 from its reflective state to its transmissive state. A control signal of the opposite polarity is simultaneously applied to displacing device 612. The rapidly-changing control signals cause displacing elements 610 and 612 to expand and contract, respectively, by substantially similar amounts, as shown in FIG. 29. This displaces part of working fluid 506 into trench region 513, as shown at 652 in FIGS. 27 and 33. This moves index-matching liquid 504 and bubble 514 along trench region 513 in the direction indicated by arrow 516 until the surfaces in trench region 513 come into engagement with constrictions 532–534. Engagement of the surfaces with the constrictions arrests movement through trench region 513 with index-matching liquid 504 interposed between waveguides 421 and 423, as shown in FIG. 25. Optical switch 600 has been changed to its transmissive state. The part of working fluid 508 displaced from trench region 513 by the part of working fluid 506 displaced from trench region 511 is accommodated by trench region 515, and specifically by the low-volume state of displacing device 612.

Figure 34:
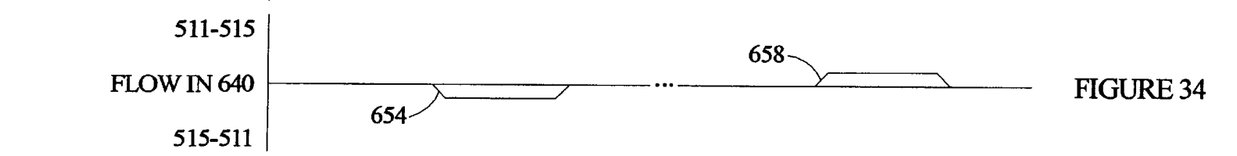
FIG. 34 is a graph showing liquid flow through the balance channel of the optical switch shown in FIG. 27 as the optical switch is switched between its reflective and transmissive states and vice versa.

FIG. 34 shows substantially no flow of working fluid through balance channel 640 during assertion of the control signals. This is due to the higher hydraulic impedance of the balancing channel compared with that of trench region 513.

Once state of optical switch 600 has been changed, power consumption is reduced by removing the control signals.

Figure 30:
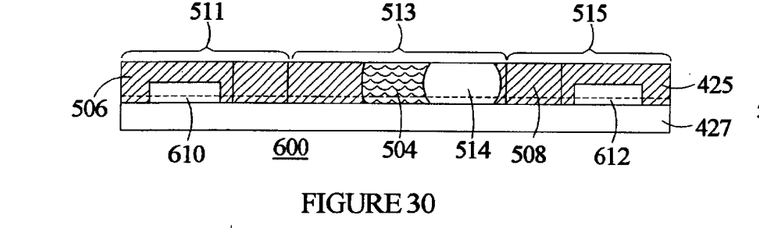
FIG. 30 is a side view of the third embodiment of an optical switch according to the invention in its equilibrium transmissive state.

The control signals are slowly reduced to zero, as shown at 653 in FIG. 32. Reducing the control signals changes the volumes of displacing devices 610 and 612 towards their equilibrium volumes, and results in a pressure imbalance between trench regions 511 and 515. The control signals are reduced at a rate that results in a pressure imbalance less than that which would dislodge index-matching liquid 504 and bubble 514 from constrictions 532-534. Instead, the pressure imbalance is reduced by working fluid 508 flowing through balance channel 640 from trench region 515 to trench region 511 as the control signals reduce, as shown at 654 in FIG. 34. Eventually, all the working fluid displaced into trench region 515 as a result of switching optical switch 600 to its transmissive state returns to trench region 511 through balance channel 640. FIGS. 27 and 30 show optical switch 600 in its equilibrium transmissive state.

Figure 31:
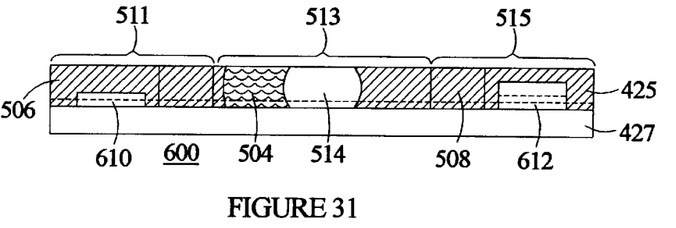
FIG. 31 is a side view of the third embodiment of an optical switch according to the invention after it has switched to its reflective state.

Optical switch 600 will stay in its equilibrium transmissive state until control signals are again applied to displacing devices 610 and 612 to switch the optical switch back to its reflective state. FIG. 32 shows at 655 the control signal applied to displacing device 610 to switch optical switch 600 from its transmissive state to its reflective state. A control signal of the opposite polarity is simultaneously applied to displacing device 612. The rapidly-changing control signals cause displacing elements 610 and 612 to contract and expand, respectively, by substantially similar amounts, as shown in FIG. 31. This displaces part of working fluid 508 into trench region 513, as shown at 656 in FIG. 33. This moves index-matching liquid 504 and bubble 514 along trench region 513 in the direction opposite that indicated by arrow 516 until the surfaces in trench region 513 come into engagement with constrictions 531–533. Engagement of the surfaces with the constrictions arrests further movement through trench region 513 with bubble 514 interposed between waveguides 421 and 423, as shown in FIG. 24. Optical switch 600 has been switched to its reflective state. The part of working fluid 506 displaced from trench region 513 by the part of working fluid 508 displaced from trench region 515 is accommodated by trench region 511, and specifically by the low-volume state of displacing device 610.

FIG. 34 shows substantially no flow of working fluid through balance channel 640 during assertion of the control signals. This is due to the higher hydraulic impedance of the balancing channel compared with that of trench region 513.

Once the state of optical switch 600 has been changed, power consumption is reduced by removing the control signals. The control signals are slowly reduced to zero, as shown at 657 in FIG. 32. Removing the control signals restores the volume of displacing devices 610 and 612 to their equilibrium volumes, and results in a pressure imbalance between trench regions 511 and 515. The control signals are reduced at a rate that results in a pressure imbalance below that which would dislodge index-matching liquid 504 and bubble 514 from constrictions 531-533. Instead, the pressure imbalance is reduced by working fluid 508 flowing through balance channel 640 from trench region 511 to trench region 515, as shown at 658 in FIG. 34. Eventually, all the working fluid received by trench region 511 as a result of switching optical switch 600 to its transmissive state returns to trench region 515 through balance channel 640. FIGS. 26 and 28 show optical switch 600 in its equilibrium reflective state.

Optical switch 600 will stay in its equilibrium reflective state until control signals are again applied to displacing devices 610 and 612 to switch the optical switch back to its transmissive state.

Various modifications to the present invention will be apparent from the foregoing description and accompanying drawings. Accordingly, the invention is defined solely by the scope of the following claims.

We claim:

1. An optical switch comprising:

a substrate;

a planar waveguide circuit supported by said substrate, said planar waveguide circuit and said substrate collectively defining a trench, said trench including a first trench region and a second trench region adjacent said first trench region, said second trench region having a width greater than said first trench region, said planar waveguide circuit including a first waveguide and a second waveguide intersecting at said first trench region and positioned such that light traversing said first waveguide enters said second waveguide when an index-matching material is present in said first trench region, and otherwise is reflected by said first trench region;

an index-matching liquid located in at least part of said first trench region;

a working fluid located in said second trench region; and a heater located in said second trench region, for displacing part of said working fluid into said first trench region to interpose said index-matching liquid between said waveguides.

2. The optical switch of claim 1, in which said index-matching liquid is additionally located in said second trench region and additionally serves as said working fluid.

3. The optical switch of claim 1, in which said heater is additionally for withdrawing said part of said working fluid to remove said index-matching liquid from between said waveguides.

4. The optical switch of claim 3, in which said index-matching liquid is additionally located in said second trench region and additionally serves as said working fluid.

5. An optical switch comprising:

a substrate;

a planar waveguide circuit supported by said substrate, said planar waveguide circuit and said substrate collectively defining a trench, said trench including a first trench region and a second trench region adjacent said first trench region, said second trench region having a width greater than said first trench region, said planar waveguide circuit including a first waveguide and a second waveguide intersecting at said first trench region and positioned such that light traversing said first waveguide enters said second waveguide when an index-matching material is present in said first trench region, and otherwise is reflected by said first trench region;

an index-matching liquid located in at least part of said first trench region;

a working fluid located in said second trench region; and a piezoelectric transducer located in said second trench region for displacing part of said working fluid into said first trench region to interpose said index-matching liquid between said waveguides.

6. An optical switch comprising:

a substrate;

a planar waveguide circuit supported by said substrate, said planar waveguide circuit and said substrate collectively defining a trench, said trench including a fist trench region and a second trench region adjacent said first trench region, said second trench region having a width greater than said first trench region, said planar waveguide circuit including a first waveguide and a second waveguide intersecting at said first trench region and positioned such that light traversing said first waveguide enters said second waveguide when an index-matching material is present in said first trench region, and otherwise is reflected by said first trench region;

an index-matching liquid located in at least part of said first trench region;

a working fluid located in said second trench region; and a diaphragm coupled to said second trench region for displacing part of said working fluid into said first trench region to interpose said index-matching liquid between said waveguides.

7. An optical switch comprising:

a substrate;

a planar waveguide circuit supported by said substrate, said planar waveguide circuit and said substrate collectively defining a trench, said trench including a first trench region and a second trench region adjacent said first trench region, said second trench region having a width greater than said first trench region, said planar waveguide circuit including a first waveguide and a second waveguide intersecting at said first trench region and positioned such that light traversing said first waveguide enters said second waveguide when an index-matching material is present In said first trench region, and otherwise is reflected by said first trench region;

an index-matching liquid located in at least part of said first trench region;

a working fluid located in said second trench region; and a micromechanical device located in said second trench region for displacing part of said working fluid into said first trench region to interpose said index-matching liquid between said waveguides.

8. The optical switch of claim 1, in which said planar waveguide circuit additionally includes a third waveguide having an end terminating at said trench and positioned such that light traversing said first waveguide enters said third waveguide when no index-matching medium is present in said first trench region.

9. The optical switch of claim 1, additionally comprising at least one constriction in said first trench region.

10. An optical switch comprising:

a substrate;

a planar waveguide circuit supported by said substrate, said planar waveguide circuit and said substrate collectively defining a trench, said trench including a first trench region, a second trench region adjacent said first trench region, said second trench region having a width greater than said first trench region, and a third trench region adjacent said first trench region and remote from said second trench region, said third trench region having a width greater than said first trench region, said planar waveguide circuit including a fist waveguide and a second waveguide intersecting at said first trench region and positioned such that light traversing said first waveguide enters said second waveguide when an index-matching material is present in said first trench region, and otherwise is reflected by said first trench region;

an index-matching liquid located in at least part of said first trench region;

a working fluid located in said second trench region and in said third trench region said working fluid and said Index-matching liquid partially filling said first trench region so that a bubble of a low refractive index material additionally exists in said first trench region;

displacing means, coupled to said second trench region and to said third trench region, for displacing part of said working fluid from said second trench region to interpose said index-matching liquid between said waveguides and for displacing part of said working fluid from said third trench region to interpose said bubble between said waveguides.

11. The optical switch of claim 10, in which said index-matching liquid is additionally located in said second trench region and said third trench region and additionally serves as said working fluid.

12. The optical switch of claim 10, additionally comprising constrictions disposed along the length of said first trench region at locations corresponding to the location of a surface of said bubble when said index-matching liquid is interposed between said waveguides and when said bubble is interposed between said waveguides.

13. The optical switch of claim 10, additionally comprising a balance channel interconnecting said second trench region and said third trench region, said balance channel having a substantially greater hydraulic resistance than said first trench region.

14. The optical switch of claim 13, additionally comprising constrictions disposed along the length of said first trench region at locations corresponding to the location of a surface of said bubble when said index-matching liquid is interposed between said waveguides and when said bubble is interposed between said waveguides.

15. The optical switch of claim 10, in which said displacing means includes heaters located in said second trench region and said third trench region.

16. The optical switch of claim 10, in which said displacing means includes piezoelectric transducers located in said second trench region and said third trench region.

17. The optical switch of claim 10, in which said displacing means includes a diaphragm coupled to said second trench region and said third trench region.

18. The optical switch of claim 10, in which said displacing means includes micromechanical devices located in said second trench region and said third trench region.

19. The optical switch of claim 10, in which said planar waveguide circuit additionally includes a third waveguide having an end terminating at said trench and positioned such that light traversing said first waveguide enters said third waveguide when no index-matching medium is present in said first trench region.

20. The optical switch of claim 5, in which said index-matching liquid is additionally located in said second trench region and additionally serves as said working fluid.

21. The optical switch of claim 5, in which said piezoelectric transducer is additionally for withdrawing said part of said working fluid to remove said index-matching liquid from between said waveguides.

22. The optical switch of claim 21, in which said index-matching liquid is additionally located in said second trench region and additionally serves as said working fluid.

23. The optical switch of claim 5, in which said planar waveguide circuit additionally includes a third waveguide having an end terminating at said trench and positioned such that light traversing said first waveguide enters said third waveguide when no index-matching medium is present in said first trench region.

24. The optical switch of claim 5, additionally comprising at least one constriction in said first trench region.

25. The optical switch of claim 6, in which said index-matching liquid is additionally located in said second trench region and additionally serves as said working fluid.

26. The optical switch of claim 6, in which said diaphragm is additionally for withdrawing said part of said working fluid to remove said index-matching liquid from between said waveguides.

27. The optical switch of claim 26, in which said index-matching liquid is additionally located in said second trench region and additionally serves as said working fluid.

28. The optical switch of claim 6, in which said planar waveguide circuit additionally includes a third waveguide having an end terminating at said trench and positioned such that light traversing said first waveguide enters said third waveguide when no index-matching medium is present in said first trench region.

29. The optical switch of claim 6, additionally comprising at least one constriction in said first trench region.

30. The optical switch of claim 7, in which said index-matching liquid is additionally located in said second trench region and additionally serves as said working fluid.

31. The optical switch of claim 7, in which said micromechanical device is additionally for withdrawing said part of said working fluid to remove said index-matching liquid from between said waveguides.

32. The optical switch of claim 31, in which said index-matching liquid is additionally located in said second trench region and additionally serves as said working fluid.

33. The optical switch of claim 7, in which said planar waveguide circuit additionally includes a third waveguide having an end terminating at said trench and positioned such that light traversing said first waveguide enters said third waveguide when no index-matching medium Is present In said first trench region.

34. The optical switch of claim 7, additionally comprising at least one constriction in said first trench region.

* * * * *